United States Patent
Hirzel et al.

(10) Patent No.: US 7,805,580 B2
(45) Date of Patent: Sep. 28, 2010

(54) METHOD AND SYSTEM FOR DETERMINING OPTIMAL DATA LAYOUT USING BLIND JUSTICE

(75) Inventors: Martin Hirzel, White Plains, NY (US); Chengliang Zhang, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 11/620,818

(22) Filed: Jan. 8, 2007

(65) Prior Publication Data
US 2008/0168249 A1    Jul. 10, 2008

(51) Int. Cl.
*G06F 12/00*    (2006.01)

(52) U.S. Cl. .................. 711/154; 711/170; 717/151; 717/158

(58) Field of Classification Search .......... 711/154, 711/170; 717/151, 158; 707/206
See application file for complete search history.

(56) References Cited

U.S. PATENT DOCUMENTS

| | | | |
|---|---|---|---|
| 6,862,729 B1 * | 3/2005 | Kuch et al. | 717/158 |
| 2004/0193815 A1 | 9/2004 | Haghighat et al. | |
| 2005/0149916 A1 | 7/2005 | Shpeisman et al. | |
| 2005/0172278 A1 | 8/2005 | Kuch et al. | |
| 2005/0177822 A1 | 8/2005 | Kuch et al. | |

OTHER PUBLICATIONS

Ali-Reza Adl-Tabatabai, Richard L. Hudson, Mauricio J. Serrano, and Sreenivas Subramoney "Prefetch Injection Based on Hardware Monitoring and Object Metadata", PLDI 2004.
Erez Petrank and Dror Rawitz, "The Hardness of Cache Conscious Data Placement", In Principles of Programming Languages, (POPL), 2002.
Chengliang Zhang, Chen Ding, Mitsunori Ogihara, Yutao Zhong, and Youfeng Wu, "A Hierarchical Model of Data Locality", In Principles of Programming Languages (POPL), 2006; and.
Chengliang Zhang and Martin Hirzel, "Blind Justice for Data Locality: Taming the Multi-armed GC Bandit", IBM Confidential, October 10, 2006; pp. 1-7.

* cited by examiner

*Primary Examiner*—Jasmine Song
(74) *Attorney, Agent, or Firm*—Scully, Scott, Murphy & Presser, P.C.; Vazken Alexanian (57) ABSTRACT

Disclosed are a method and system for finding an optimal data layout. The approach of the present invention is to try one of several data layouts in the memory, measure the impact of said one data layout on a performance of a program, and decide which of said several data layouts to try next. The trying and measuring steps are repeated, and one of said several data layouts is selected as best or optimal based on the measurings. The preferred embodiment of the invention provides layout auditing, a framework for picking the best data layout online without requiring any user input. Layout auditing optimizes data layouts with a try-measure-decide feedback loop: use a data reorganizer to try one of several data layouts, use a profiler to measure the impact of the data layout on performance, and use a controller to decide which data layout to try next.

5 Claims, 4 Drawing Sheets

FIG. 4b  REWARD, DECAY=0.95

FIG. 4c  REWARD, DECAY=1.0

FIG. 4e  PROBABILITY, DECAY=0.95

FIG. 4f  PROBABILITY, DECAY=1.0

FIG. 4h  CHOICE, DECAY=0.95

FIG. 4i  CHOICE, DECAY=1.0

METHOD AND SYSTEM FOR DETERMINING OPTIMAL DATA LAYOUT USING BLIND JUSTICE

BACKGROUND OF THE INVENTION

1. Field of the Invention

The present invention generally relates to data processing, and more specifically, the invention relates to finding an optimal data layout. Even more specifically, the invention relates to a procedure for trying different data layouts and then using the evidence to decide objectively the best of these layouts.

2. Background Art

Figure 1:
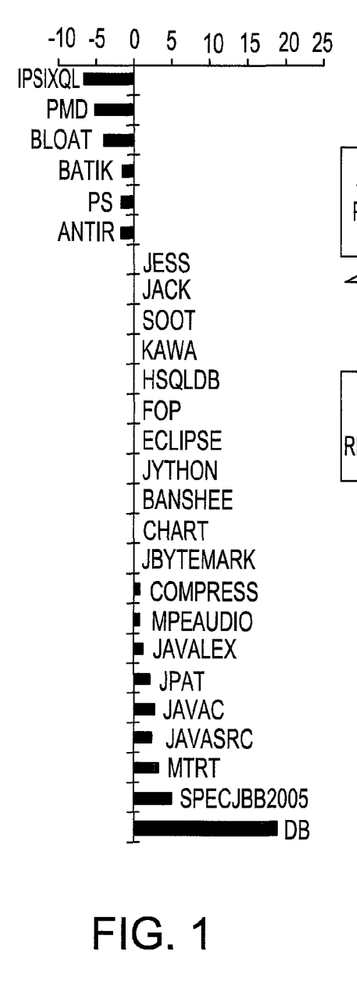
FIG. 1 illustrates how the same data layout can degrade or improve runtime depending on how well the data layout matches a program's data accesses.

Cache and TLB misses often cause programs to run slowly. For example, it has been reported that the SPECjbb2000 benchmark spends 45% of its time stalled in misses on an Itanium processor (Ali-Reza Adl-Tabatabai, Richard L. Hudson, Mauricio J. Serrano, and Sreenivas Subramoney, "Prefetch Injection Based on Hardware Monitoring and Object Metadata"). Cache and TLB misses often stem from a mismatch between data layout and data access order. For example, FIG. 1 shows that the same data layout can degrade or improve runtime depending on how well it matches the program's data accesses, and on how expensive the layout is to apply. Results like those in FIG. 1 are typical: optimizations that improve performance for some programs often risk degrading performance for other programs. The results depend on tradeoffs between optimization costs and rewards, on interactions between complex software and hardware systems.

Picking the best data layout a priori is difficult. It has been shown that even with perfect knowledge of the data access order, finding the optimal data placement, or approximating it within a constant factor, is NP-hard (Erez Petrank and Dror Rawitz, "The Hardness of Cache Conscious Data Placement", In Principles of Programming Languages, (POPL), 2002). Others have shown that finding a general affinity-hierarchy layout is also NP-hard (Chengliang Zhang, Chen Ding, Mitsunori Ogihara, Yutao Zhong, and Youfeng Wu, "A Hierarchical Model of Data Locality. In Principles of Programming Languages (POPL), 2006). Practically, picking a data layout before the program starts would require training runs and command line arguments, both of which impede user acceptance.

Another option is to pick the best data layout automatically and online, while the program is executing. This also facilitates adapting to platform parameters and even to phases of the computation. The usual approach for this is to collect information about program behavior, then optimize the data layout, and possibly repeating these steps to adapt to phases. This approach requires tradeoffs: collecting useful information without slowing down the program too much, and transforming the information into the correct optimization decisions for the given platform. Getting these tradeoffs right requires careful tuning.

Driving a data layout optimization with profile information leads to a tightly woven profiler/optimizer co-design. For example, when a copying garbage collector performs the optimization, the collector design is geared towards using a profile. Published research prototypes usually compromise other design goals. For example, most locality-improving garbage collectors are sequential, compromising parallel scaling. In addition, such a design buries what is essentially a machine-learning problem in a complex system, out of reach for off-the-shelf machine learning solutions.

SUMMARY OF THE INVENTION

An object of this invention is to find an optimal data layout.

Another object of the invention is to provide a method and system for finding an optimal data layout by first trying different data layouts, then evaluating their performance, and based on that evaluation, changing data layout decisions.

A further object of the present invention is to use copying garbage collection as the mechanism for executing data layout decisions.

Another object of the preferred embodiment of the invention is to provide a profiling technique that simultaneously evaluates multiple co-existing data layouts.

These and other objectives are attained with a method and system for improving data locality in a memory. The method comprises the steps of trying one of several data layouts in the memory, measuring the impact of said one data layout on a performance of a program, and deciding which of said several data layouts to try next. The trying and measuring steps are repeated, and one of said several data layouts is selected as best or optimal based on the measurings.

The preferred embodiment of the invention provides layout auditing, a framework for picking the best data layout online without requiring any user input. Layout auditing optimizes data layouts with a try-measure-decide feedback loop: use a data reorganizer to try one of several data layouts, use a profiler to measure the impact of the data layout on performance, and use a controller to decide which data layout to try next.

The data reorganizer tries a layout for the program's data. The data reorganizer can reorder data arrays or index arrays for scientific programs; or it can copy objects in a specific order during garbage collection for object-oriented programs; or it can even remap addresses using special-purpose hardware. Layout auditing works with off-the-shelf data reorganizers, and the engineers who implement them need not be aware that the layouts get picked based on profile information.

The profiler measures the reward of the layout of the program's current data. The reward is high if the program spends little physical time per virtual time. Virtual time is a data layout-independent measure of program progress, such as loop iterations or allocated bytes. Physical time (seconds) depends on the data layout. The profiler can either simply obtain physical time from the CPU clock, or it can derive physical time from other information sources. The profiler reports not just the reward of a data layout in terms of program performance, but also the cost of the data reorganizer, profiler, and controller. The controller decides the layout for the next data reorganization, and also decides how much, if any, time to spend on profiling. If the controller is confident about which layout is best, it picks that layout to exploit its good performance characteristics. If the controller is uncertain, it picks a layout it is curious about, to explore its reward. The controller uses off-the-shelf reinforcement learning techniques. It turns the reward and curiosity for each data layout into a probability, and then picks randomly from its repertoire of layouts using those probabilities. To adapt to phase shifts, the profiler never allows probabilities to drop to zero, so that it always performs a minimal amount of exploration.

Selecting one of several layouts is a multi-armed bandit problem. The analogy is that of a slot machine (one-armed bandit), but with more than one arm. Each arm is a data layout, and the reward is improved program performance.

The controller repeatedly tries different arms, and hones in on the best ones. Layout auditing subscribes to the philosophy of blind justice. The controller is a fair and impartial judge who decides based on hard evidence only, and gives each candidate the benefit of the doubt. In fact, the judge is not only fair, but also merciful: even when a layout performs badly, it still gets sampled occasionally to check for phase changes.

Layout auditing combines the advantages of two strands of prior work. First, like online profile-directed locality optimizations, it adapts to platforms, programs, and phases to achieve better performance than what offline optimization can achieve. Second, like performance auditing, it separates optimization concerns from controller concerns, it requires no correct model of complex hardware interaction, and it does not get fooled by misleading access patterns where finding the optimal data layout is NP-hard. Unlike performance auditing, the present invention addresses data layouts, not code optimization, and adapts to phases. The invention differs from prior profile-directed locality optimizations as well as from performance auditing in that it uses a uniform controller for not just performance rewards, but also optimization and profiling costs.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

The present invention, generally, provides a procedure for finding an optimal data layout. In accordance with the instant invention, this is done by trying one of several data layouts in the memory, measuring the impact of said one data layout on a performance of a program, and deciding which of said several data layouts to try next. The trying and measuring steps are repeated, and one of said several data layouts are selected as best or optimal based on the measurings.

The preferred embodiment of the invention provides layout auditing, a framework for picking the best data layout online without requiring any user input. Layout auditing optimizes data layouts with a try-measure-decide feedback loop: use a data reorganizer to try one of several data layouts, use a profiler to measure the impact of the data layout on performance, and use a controller to decide which data layout to try next.

Layout Auditing Framework

Figure 2:
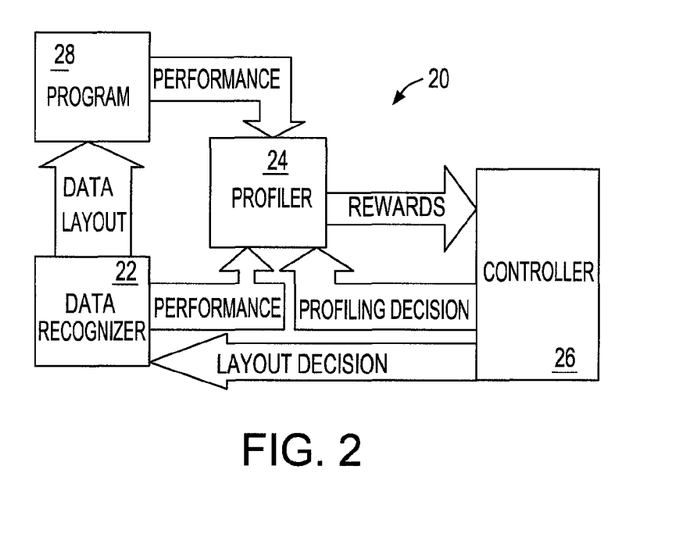
FIG. 2 shows a procedure for determining a data layout in accordance with the present invention.

FIG. 2 illustrates the preferred try-measure-decide feedback loop 20 of layout auditing. The data reorganizer 22 tries a data layout, the profiler 24 measures its reward, and the controller 26 decides the next actions of the data reorganizer and the profiler. This section generally outlines what each component does.

Data Reorganizer

The data reorganizer 22 executes a layout decision by placing data of program 28 in a specific order in memory. The layout affects program performance; in addition, the performance of the data reorganizer itself is monitored by the profiler.

As discussed in more detail below, the invention preferably uses copying garbage collection to implement the data reorganizer. This preferred embodiment of the invention is based on high-performance implementations of well-known collector algorithms that ship with a product language runtime system. Garbage collection is widely used to support robust software in domains ranging from embedded systems to enterprise servers.

Program

The program 28 performs some calculation on behalf of the user. It is oblivious to the layout auditing feedback loop that surrounds it. The layout of the program's data in memory is determined by the data reorganizer, and the program's performance is monitored by the profiler.

Described below is a suite of 20 large programs from a wide range of application domains. They run unperturbed on a product language runtime system with JIT compilation, a popular operating system, and stock hardware.

Profiler

The profiler 24 monitors the performance of the program 28 and the data reorganizer 22. It reports rewards for each data layout to the controller. Rewards measure physical time per virtual time. Virtual time is a metric of program progress that is independent of the data layout, such as loop iterations or allocated bytes.

Described below is a minimalist profiler. It simply looks at the machine clock to obtain physical time in seconds, and counts bytes allocated as virtual time. The minimalist profiler uses the most authoritative model of the interaction of data layouts with the hardware: concrete measurements of unperturbed execution.

Controller

The controller 26 turns rewards of data layouts into decisions for which layout to try next, and how much profiling to do. The controller is responsible for optimizing overall performance, even when the program has phase changes.

Also described below is the softmax controller. It uses a simple reinforcement learning policy [Richard S. Sutton and Andrew G. Barto, *Reinforcement Learning: An Introduction*. MIT Press, 1998] to turn rewards into probabilities. The controller remembers historical rewards to avoid unstable decisions when there is noise, but it decays old rewards to adapt to phase changes.

Softmax Controller

The controller turns data layout rewards from the profiler into layout decisions for the data reorganizer, and profiling decisions for the profiler. It does so by first turning rewards into probabilities, and then deciding randomly based on those probabilities.

Layout Decision

In reinforcement learning, functions that map rewards to probabilities are known as policies. The softmax controller is named for the softmax policy [Richard S. Sutton and Andrew G. Barto, *Reinforcement Learning: An Introduction*. MIT Press, 1998]:

$$Pr(l) = \frac{e^{reward(l)/\tau}}{\sum_{l'} e^{reward(l')/\tau}} \quad (1)$$

Equation 1 calculates Pr (l), the probability with which the controller will decide on layout l for the next data reorganization. Layouts with higher rewards receive higher probabilities, since $e^{reward(l)/\tau}$ is larger. Before exponentiation, each reward is divided by a temperature $\tau$. A high $\tau$ makes probabilities of different rewards more similar. A low $\tau$ emphasizes the reward differences in the probabilities; at low temperatures, controller decisions "freeze". After exponentiation, the values are normalized such that the probabilities add up to 1.

Depending on the temperature, layout auditing will spend additional time exploring other layouts besides the best layout. Spending time on exploration is only justified if the information so far is too unreliable to exploit. To make this tradeoff, the controller computes the pooled standard error of the rewards of all layouts, and uses that as a curiosity value. It then sets the temperature such that the expected reward of the chosen layout differs from the reward of the best layout only by a small constant k times the curiosity. Given a temperature $\tau$, the expected reward of a randomly chosen layout is $$\text{expected Reward}(\tau) = \sum_l \left\{ Pr_\tau(l) \cdot reward(l) \right\} \quad (2)$$

The controller tries different values for $\tau$ using binary search until the absolute difference between the maximum reward and the expected reward matches the desired value k·curiosity:

$$k \cdot \text{curiosity} = \left| \max_\tau \{reward(l)\} - \text{expected Reward}(\tau) \right| \quad (3)$$

We chose k=1% to ensure that the system always performs close to the best layout.

Curiosity is the pooled standard error of historical rewards for different layouts. To adapt to changes in program behavior, it should weigh recent results more heavily than old results that might come from a different phase. The controller achieves this with exponential decay. To implement different weights, the pooled standard error ranges over a larger population that contains multiple copies of values that should be weighed more heavily, but omits values of near-zero weight. To adapt to phase changes and leave space for wrong judgments, the controller shows mercy to layouts that performed badly in the past. It achieves this by assigning each layout a probability of at least 5%, regardless of its reward. The cost is degraded performance compared with the best layout. The controller assumes that unexplored layouts, for which there is no data yet, initially have infinite rewards.

Profiling Decision

Some profilers incur overhead, and should only be activated when their benefits (information gain) outweigh their costs (overhead). The decision to profile (p=T) or not (p=⊥) is a two-armed bandit problem, which the controller decides with reinforcement learning analogously to the multi-armed layout decision. The reward of profiling, reward(p=T), is the reward of satisfied curiosity, which, as discussed above, is defined as the pooled standard error of layout costs. The reward of not profiling, reward(p=⊥), is avoiding two overheads: profiling overhead incurred during program execution plus overhead incurred when the profiler processes raw measurements to compute layout rewards.

The controller computes reward(p=T), and relies on the profiler to report its own overhead in the form of reward (p=⊥). The controller then decides whether or not to profile during the next execution interval using the softmax policy $$Pr(p) = \frac{e^{reward(p)/\tau}}{\sum_{p'} e^{reward(p')/\tau}} \quad (4)$$

The temperature $\tau$ is the same as in Equation 3. The minimalist profiler incurs no measurable profiling overhead, so for this paper, the profiler was always active, without controller decisions.

Minimalist Profiler

The profiler monitors the performance of the program and the data reorganizer, and turns them into rewards for each data layout for the controller. The measurements of the minimalist profiler are very simple: seconds and allocated bytes. Both can be obtained trivially at negligible overhead. This section discusses how the minimalist profiler turns seconds and bytes into rewards for each layout.

Internally, the minimalist profiler computes costs, which are negative rewards, so low costs correspond to high rewards and vice versa. A cost is a seconds-per-byte ratio, and has the advantage of being additive when there are different costs from different system components. Formally, the reward of a data layout l is $$reward(l) = -\cos t(l) \quad (5)$$

The cost of a layout l is the sum of its seconds e per virtual time v during program execution, and its seconds r per virtual time v during data reorganization:

$$\cos t(l) = \frac{e_l}{v} + \frac{r_l}{v} \quad (6)$$

The ratios in Equation 6 represent averages of ratios of corresponding historical measurements. To explain what that means, we first introduce some notation. Let $e_i$ be the physical time of the program execution interval that follows reorganization i; let $v_i$ be the virtual time in number of bytes allocated between reorganizations i and i+1; and let l be the layout of reorganization i. The minimalist profiler calculates $$\frac{e_l}{v} = avg\left\{ \frac{e_i}{v_i} \right\} l_i = l \quad (7)$$

In words: to compute the program's seconds per bytes ratio for layout l, average the set of historical ratios of $e_i/v_i$ that used layout l. Likewise, given the physical time $r_i$ of data reorganization number i, the formula for data reorganizer time ratios is $$\frac{\tau_l}{v} = avg\left\{\frac{\tau_i}{v_{i-1}} \mid l_i = l\right\} \quad (8)$$

The minimalist profiler assumes that reorganizer time $\tau_i$ is proportional to the allocation volume vi−1 of the preceding execution interval, and that execution time $e_i$ reflects the layout l of the preceding data reorganization.

Averaging over historical values (Equations 7 and 8) reduces noise. To reduce noise further, the averages omit outliers. The averages are weighted toward recent data using an exponential decay curve, to adapt when program behavior changes over time.

In addition to rewards for layouts, profilers also report their own cost to the controller in the form of reward(p=⊥), which is the reward of not profiling. Since the minimalist profiler incurs no overhead, there is no reward for not profiling, hence reward (p=⊥) is always 0.

To summarize, the minimalist profiler uses only information that is available on any platform: seconds and allocated bytes. The disadvantage is that layout auditing will settle only slowly when there is too much noise. Another drawback is the assumption that program execution time reflects the data layout of the previous data reorganization only, which plays down the effect of data in a different memory area that was unaffected by that reorganization, and thus has a different layout. On the positive side, the minimalist profiler is cheap, portable, and direct.

Data Reorganization With Garbage Collection

The data reorganizer tries a layout for the program's data. There are many possible implementations for data reorganizers; this invention may use off-the-shelf garbage collection algorithms [Richard Jones and Rafael Lins. *Garbage collection: Algorithms. for automatic dynamic memory management*. John Wiley & Son Ltd., 1996]. This section reviews background on copying collectors, and describes some common data layouts.

The preferred embodiment of the present invention thus uses copying garbage collection to achieve different data layouts. Copying garbage collection divides heap memory into two semispaces. Only one semispace is active for allocation. Garbage collection starts when the active semispace is full. The collector traverses pointers from program variables to discover reachable objects, which it copies to the other semispace (from from-space to to-space).

The discussion herein refers to the different copy orders and their corresponding data layouts by first letters: A=allocation order, B=breadth-first, D=depth-first, H=hierarchical. Preserving is denoted by "1", since preserving any other order o keeps it unchanged (o·1=o). Empty space is denoted by "0", since applying any order on empty space keeps it unchanged (0·o=0). Otherwise, orders supersede their predecessor ($o_1 \neq 0, o_2 \neq 1 \Rightarrow o_1 \cdot o_2 = o_2$).

Most language runtime systems today use generational garbage collectors, because they tend to yield the best throughput. Generational garbage collectors segregate objects by age into generations. Younger generations are collected more often than older generations, which reduces overall collector work, because most objects become unreachable while they are still young. The examples of the invention described herein are based on a generational garbage collector with two generations, a copying young generation and a mark-sweep old generation. The collector also implements numerous other techniques, among others, parallelism and tilted semi-spaces.

Figure 3:
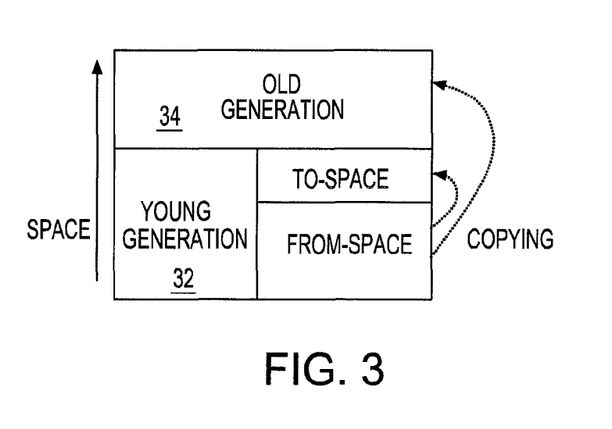
FIG. 3 depicts generational copying garbage collection.
Figure 4A:
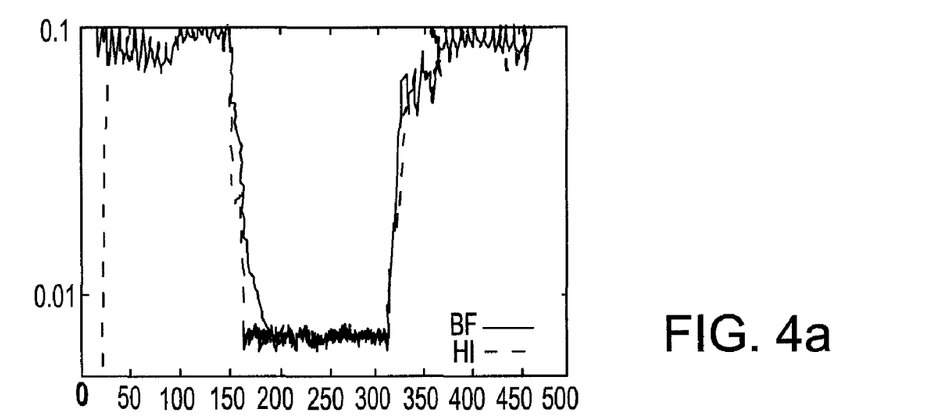
FIGS. 4a-4i show results obtained with the present invention.
Figure 4B:
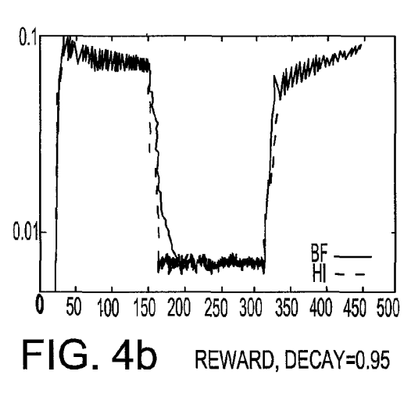
Figure 4C:
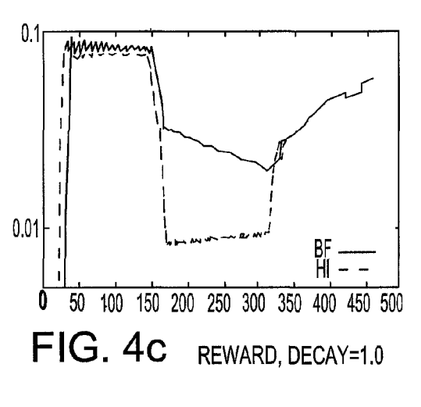
Figure 4D:
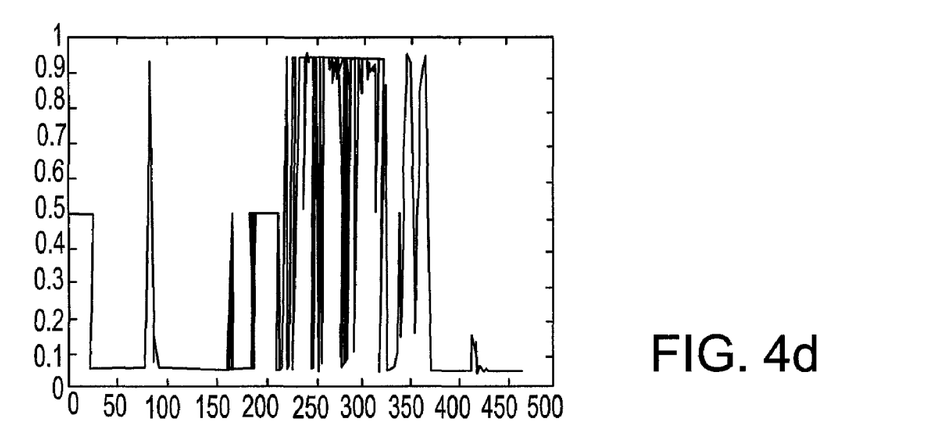
Figure 4E:
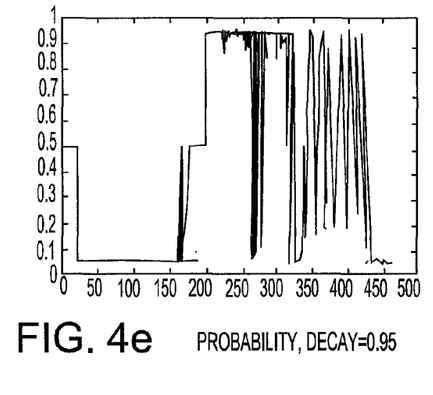
Figure 4F:
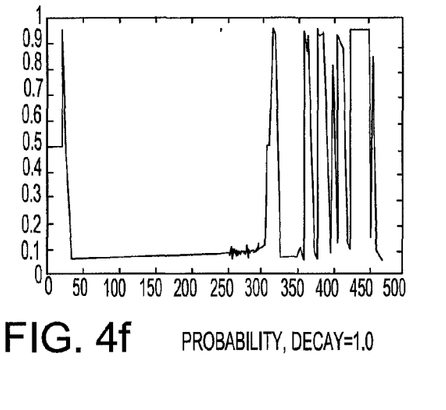
Figure 4G:
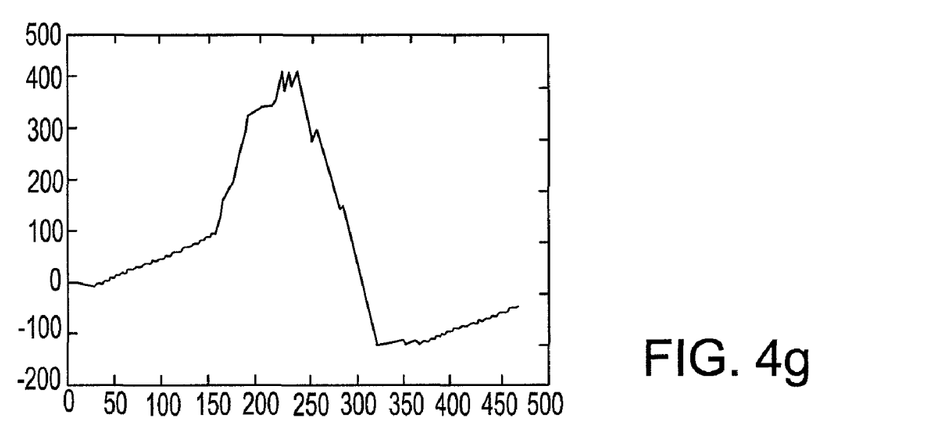
Figure 4H:
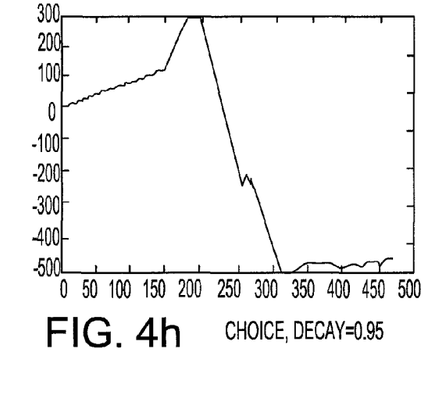
Figure 4I:
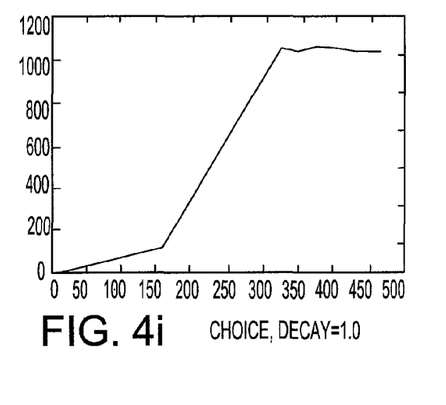

FIG. 3 shows the two kinds of copying: between the semi-spaces of the young generation 32, and from the young generation to the old generation 34 when an object has reached its tenuring threshold. Each garbage collection can independently choose a copy order. Each set of objects allocated between the same two collections starts out in allocation order, and may then experience different orders as it gets copied within the young generation. When the objects reach an age threshold, they get copied into the old generation (tenured), where they come to rest with a final layout.

The repeated data reorganizations when copying objects give layout auditing the opportunity to find the best layout.

TABLE 1

| Abbreviations | | | |
|---|---|---|---|
| AO | Allocation order | "0" | Empty |
| BF | Breadth-first | "1" | Preserving |
| DF | Depth-first | LA | Layout auditing |
| HI | Hierarchical | | |
| (a) Data Layouts | | (b) Other | |

Data Layouts

This section surveys the data layouts depth-first, breadth-first, hierarchical, and, using order-preserving garbage collection, allocation order. Table 1 shows abbreviations for each layout. Preserving is denoted by "1", since preserving any other data layout l keeps it unchanged (l·1=l). Empty space is denoted by "0", since applying any layout on an empty space keeps it unchanged (0·l=0). Otherwise, layouts supersede their predecessor ($l_1 \neq 0, l_2 \neq 1 \Rightarrow l_1 \cdot l_2 = l_2$).

Fenichel and Yochelson's recursive algorithm uses variables on the call stack to keep track of already copied objects that may contain pointers to not-yet copied objects [Robert R. Renichel and Jerome C. Yochelson. A LISP garbage-collector for virtual-memory computer system. *Communications of the ACM (CACM)*, 1969.]. Using a LIFO-stack leads to copying objects in depth-first order. Other depth-first copying collectors are not recursive, but maintain the stack as an explicit data structure and share it between parallel collector threads. Depth-first copying yields good data locality if the program often accesses a parent object together with a child object that it points to, and that parent→child pointer is the first pointer from the given parent that the collector traverses.

Methodology

Table 2 shows the benchmark suite, consisting of 20 Java programs: pseudojbb05, which runs SPECjbb20051 for a fixed number of transactions; the 7 SPECjvm98 programs2; the 11 DaCapo benchmarks version 2006-10 [S. M. Blackburn, R. Garner, C. Hoffman, A. M. Khan, K. S. McKinley, R. Bentzur, A. Diwan, D. Feinberg, D. Frampton, S. Z. Guyer, M. Herzel, A. Hosking, M. Jump, H. Lee, J. E. B. Moss, A. Phansalkar, D. Stefanović, T. VanDrunen, D. von Dencklage, and B. Weidermann. The DaCapo benchmarks: Java benchmarking development and analysis. In *Object-Oriented Programming Systems, Languages, and Applications (OOPSLA)*, 2006]; and ipsixq13. To reduce the effect of noise on the results, each run contains several iterations (application invocations within one JVM process invocation), as shown in Column "Command line arguments". Column "Parallel" indicates whether the program has multiple parallel threads ("yes"). Column "MB" gives the minimum heap size in which the program runs without throwing an OutOfMemoryError.

All experiments discussed herein provide each program with 4× its minimum heap size; when the heap size is exhausted, the program performs a garbage collection.

TABLE 2

Benchmark programs.

| Name | Suite | Command line arguments | Description | Parallel? | MB |
|---|---|---|---|---|---|
| antlr | DaCapo | -s large -n 16 antlr | parser generator | | 2.0 |
| bloat | DaCapo | -s large -n 4 bloat | bytecode | | 16.1 |
| chart | DaCapo | -s large -n 8 chart | pdf graph plotter | | 14.3 |
| compress | jvm98 | -a -m72 -M72 -s100 _201_compress | Lempel-Ziv compressor | | 7.0 |
| db | jvm98 | -a -m24 -M24 -s100 _209_db | in-memory database | | 11.2 |
| eclipse | DaCapo | -s small -n 4 eclipse | development environment | yes | 14.0 |
| fop | DaCapo | -s large -n 60 fop | XSL-FO to pdf converter | | 9.1 |
| hsqldb | DaCapo | -s large -n 12 hsqldb | in-memory JDBC database | yes | 173.8 |
| ipsixql | Colorado | 80 7 | in-memory XML database | | 2.5 |
| jack | jvm98 | -a -m164 -M164 -s100 _228_jack | parser generator | | 1.3 |
| javac | jvm98 | -a -m92 -M92 -s100 _213_javac | Java compiler | | 20.5 |
| jess | jvm98 | -a -m228 -M228 -s100 _202_jess | expert shell system | | 2.1 |
| jython | DaCapo | -s large -n 4 jython | Python interpreter | | 1.9 |
| luindex | DaCapo | -s large -n 32 luindex | text indexing for search | | 2.2 |
| lusearch | DaCapo | -s large -n 8 lusearch | keyword search in text | yes | 7.1 |
| mpegaudio | jvm98 | -a -m156 -M156 -s100 _222_mpegaudio | audio file decompressor | | 1.0 |
| mtrt | jvm98 | -a -m232 -M232 -s100 _227_mtrt | multi-threaded raytracer | yes | 8.7 |
| pmd | DaCapo | -s large -n 4 pmd | source code analyzer | | 15.7 |
| pseudojbb05 | jbb05 | -propfile SPECjbb-4x200000.props | business benchmark | yes | 123.9 |
| Xalan | DaCapo | -s large -n 16 xalan | XSLT processor | | 27.5 |

TABLE 3

Memory hierarchy parameters per core.

| | L1 Cache | | L2 Cache | | TLB | |
|---|---|---|---|---|---|---|
| | AMD | Intel | AMD | Intel | AMD | Intel |
| Associativity | 2 | 8 | 16 | 8 | 4 | 8 |
| Block size | 64 B | 64 B | 64 B | 64 B | 4 KB | 4 KB |
| Capacity/blocks | 1,024 | 256 | 16K | 16K | 512 | 64 |
| Capacity/bytes | 64K | 16K | 1,024K | 1,024K | 2,048K | 256K |

The experiments discussed herein were conducted on one 2-processor Linux/IA32 machine, one 2-processor Linux/AMD machine, and one 4-processor Linux/AMD machine. The Intel machine was a Pentium 4 clocked at 3.2 GHz with SMT, so the 2 physical processors correspond to 4 virtual processors. The AMD machines had Opteron 270 cores clocked at 2 GHz, with 2 cores per chip, so the 2-processor machine has 1 chip and the 4-processor machine has 2 chips. Table 3 shows the configuration of the data caches and TLBs for each core. We implemented layout auditing in J9, which is IBM's high-performance product Java virtual machine. The experiments discussed herein are based on an internal development release of J9.

Results

This section evaluates data layout auditing using the concrete component instantiations from earlier sections: softmax policy, minimalist profiler, and data reorganization by copying garbage collection.

A Control Theoretic Approach To Controller Evaluation

Layout auditing employs an online feedback loop to control a system. Such feedback loops have been extensively studied in control theory. Control theory commonly talks about SASO properties: Stability, Accuracy, Settling, and Overshoot. A good controller is a controller that is stable, accurately makes the right decisions, settles on that decision quickly, and does not overshoot the range of acceptable values. In the context of layout auditing, stability means sticking with a data layout once the controller picks one; accuracy means picking the data layout that yields the best performance; and settling is the time from the start or from a phase shift until the controller has made a decision. Overshoot does not apply in this context, because all layout decisions are in the range of acceptable values by definition. This is common for discrete, rather than continuous, control systems.

In addition to the SASO properties, layout auditing strives to achieve two other desirable properties: low overhead and phase adaptivity.

Since the minimalist profiler treats the time for data reorganization as part of the reward of a data layout, there is no separate overhead for data reorganization. The minimalist profiler just reads the clock and counts bytes, so it does not incur any overhead on its own. This leaves controller overhead: time spent doing the statistical calculations in the softmax controller. On average, each control decision takes on the order of 0.1 ms. Compared to data reorganization times, which are on the order of 10 ms to 100 ms, controller overhead is negligible in most cases.

Phase adaptivity is the ability of the controller to change its decision if the program changes its behavior such that a different data layout becomes the best data layout. The minimalist profiler and the softmax controller achieve phase adaptivity by using exponential decay to forget old profile information. The decay factor determines how well layout auditing can adapt to phase changes.

Overall, layout auditing can make investments, such as profiling overhead, data reorganization cost, or time spent exploring data layouts it is curious about. For these investments, it reaps rewards, such as improved program execution time or improved data reorganization time due to reduced cache and TLB misses. The success of layout auditing depends on its ability to make the right tradeoff between the different investments and rewards.

Accuracy

This section explores the accuracy of the layout auditer presented herein. Accuracy is the ability of the controller to accurately pick the correct data layout. If it does, then the bottom-line performance of a program when run with layout auditing should match the performance of that program with its best statically chosen layout. In terms of FIG. 1, layout auditing should get all the speedups for programs at the right side of the bar chart, while avoiding all the slowdowns for programs at the left side of the bar chart. To evaluate accuracy, this section ran all 20 benchmark programs from Table 2 using the breadth-first (BF) and hierarchical (HI) data layout, both with and without layout auditing (LA). Each configuration was run 9 times, and the results report the average of the fastest 6 runs.

TABLE 4

Percent slowdown compared to best.

| Benchmark | HI | BF | LA | HI | BF | LA | HI | BF | LA |
|---|---|---|---|---|---|---|---|---|---|
| antlr | 0 | 0 | 1.8 | 0 | 0 | 0 | 0 | 0 | 1.4 |
| bloat | 6.4 | 0 | 0 | 0 | 0 | 0 | 0 | 0 | 0 |
| chart | 3.0 | 0 | 0 | 4.2 | 0 | 2.1 | 2.3 | 0 | 1.2 |
| compress | 0 | 0 | 0 | 0 | 0 | 0 | | | |
| db | 0 | 9.2 | 0 | 0 | 6.2 | 1.8 | 0 | 7.0 | 1.2 |
| eclipse | 0 | 5.9 | 0 | 0 | 5.1 | 0 | 0 | 0 | 0 |
| fop | 0 | 0 | 0 | 0 | 0 | 0 | | | |
| hsqldb | 0 | 0 | 0 | 0.9 | 0.6 | 0 | | | |
| ipsixql | 12.6 | 0 | 0.8 | 9.1 | 0 | 0 | 13.0 | 0 | 2.7 |
| jack | 2.9 | 0 | 0 | 0 | 0 | 0 | | | |
| javac | 1.2 | 0 | 0 | 0.7 | 0 | 0 | 1.1 | 0.8 | 0 |
| jess | 3.7 | 0 | 4.0 | 2.9 | 0 | 3.2 | | | |
| jython | 0 | 0 | 0 | 0 | 0 | 0 | | | |
| luindex | 1.2 | 0 | 1.0 | 0 | 0 | 0 | | | |
| lusearch | 0 | 0 | 0 | 0 | 0 | 1.1 | | | |
| mpegaudio | 0 | 0 | 0 | 0 | 0 | 0 | | | |
| mtrt | 0 | 0 | 0 | 0 | 0 | 0 | 0 | 0.7 | 1.2 |
| pmd | 0 | 0 | 0 | 3.7 | 0 | 0 | 0 | 0 | 0 |
| pseudojbb05 | 0 | 0 | 0 | 0 | 0 | 0 | 0 | 3.2 | 1.3 |
| xalan | 3.9 | 0 | 0 | 0 | 0 | 0 | | | |
| Average | 1.7 | 0.8 | 0.4 | 1.1 | 0.6 | 0.4 | 1.6 | 1.2 | 0.9 |
| # not 0 | 8 | 2 | 4 | 6 | 3 | 4 | 3 | 4 | 6 |
| Worst | 12.6 | 9.2 | 4.0 | 9.1 | 6.2 | 3.2 | 13.0 | 7.0 | 2.7 |
| | (a) 4-proc. AMD | | | (b) 2-proc AMD | | | (c) 2-proc. Intel | | |

Table 4 shows the results. For each of the 3-runtime platforms (4-processor AMD, 2-processor AMD, and 2-processor Intel), there is one column for each of the data layouts HI and BF and one for layout auditing LA. All the numbers are percent slowdowns compared to the best runtime of the given benchmark/platform combination. For example, for db on the 2-processor AMD machine, HI was best, breadth-first caused a 9.2% slowdown compared to HI, and LA matched the performance of HI. A "0" in Table 4 means that the result of the 6 runs with that data layout were indistinguishable from the results of the best data layout for that benchmark and platform, using Student's t-test at 95% confidence. At the bottom of Table 4, there are summary rows: "# not 0" counts benchmarks for which the layout was not the best, "Average" is the arithmetic mean of the slowdowns of the layout compared to the best layout for each benchmark, and "Worst" is the maximum slowdown of the layout compared to the best.

Table 4 demonstrates that on average, layout auditing performs better than any statically chosen data layout. On all three platforms, its average slowdown is less than 1% of an oracle that would pick the best layout for each program statically. Note that Petrank and Rawitz have shown conclusively that building such an oracle would be impractical [Erez Petrank and Dror Rawitz. The hardness of cache conscious data placement. In *Principles of Programming Languages* (*POPL*), 2002]. Layout auditing usually, but not always, matches the performance of the best data layout for a program and platform; sometimes the program finishes executing too quickly for LA to settle on the best layout and recoup its exploration costs. However, layout auditing has the most benign worst cases. Statically picking the wrong layout can slow down execution by up to 13%, but dynamically picking with layout auditing never causes slowdowns exceeding 4%.

To conclude, layout auditing is accurate. It makes good on its promise of requiring no model of the complex hardware/software interaction: it works equally well with no user tuning on three platforms. The next section explores its settling, stability, and phase adaptivity.

Settling, Stability, and Phase Adaptivity

This section investigates how long the implementation of layout auditing takes to settle, whether it is stable once it reaches a decision, and whether it can adapt to phase changes. This section answers these questions with a layout auditing experiment designed to illustrate phase changes, while still being realistic. Let T be the time in seconds since the start of the run, then the experiment first executes benchmark db from T=0 to T=155, then executes benchmark mtrt from T=155 to T=320, and finally goes back to db from T=320 to T=475. The softmax controller decides between the breadth-first data layout BF and the hierarchical data layout HI. The experiment ran on the 2-processor AMD machine, and used heap size 44.8 MB, which is 4× the minimum for db and 5.1× the minimum for mtrt. This setup models what happens when a server machine changes to a different workload that exercises different code.

FIG. 4 shows the results. There are three columns: Column (a/d/g) is based on a run where the minimalist profiler and the softmax controller use decay 0.9, Column (b/e/h) uses decay 0.95, and Column (c/f/i) did not decay historical values (decay=1.0). The x-axis of all graphs is the same: physical time in seconds. Row (a/b/c) shows rewards as reported by the minimalist profiler, Row (d/e/f) shows the controller's current probability of BF, and Row (g/h/i) shows the cumulative number of decisions for HI and against BF. Each time the controller chooses HI for a data reorganization, the choice curve increases by one; each time the controller chooses BF, the choice curve decreases by one.

The reward graphs (FIGS. 4(a/b/c)) use a logarithmic y-axis, because data layout rewards are an order of magnitude higher in db than in mtrt. The phase transitions at around T=155 and T=320 are clearly visible. With a decay value of 0.9, the minimalist profiler quickly forgets earlier data, and therefore computes a reward that closely follows each spike in the data. Zooming in closely on the first phase in FIG. 4(a) reveals that the rewards for HI are higher than the rewards for BF, but the difference is lower than the amplitude of the program's own performance behavior over time. FIG. 4(c) shows that when the decay is 1.0, the profiler never forgets, and the curve becomes smooth over time. This means that without decay, the profiler cannot adapt to phases: by the last phase, the rewards of BF and HI are indistinguishable.

FIGS. 4(a/b/c) show that the controller faces a tough challenge: it has to learn the best layout despite the fact that the difference between the layouts is dwarfed by the difference between program phases.

The probability graphs (FIGS. 4(d/e/f)) illustrate settling. For decay 0.9, the controller settles on the best data layout for each phase at approximately T=20, T=220, and T=370, which is 20, 75, and 50 seconds after the phase transitions. For decay 0.95, the controller settles on the best data layout for each phase at approximately T=15, T=200, and T=445, which is 15, 45, and 125 seconds after the phase transitions. For decay 1.0, the controller settles on HI for the first phase, but then takes the entire second phase to discover that HI is no longer the best, and is then unstable during the last phase. This illustrates that decay is necessary for phase adaptivity.

The probability graphs (FIGS. 4(d/e/f)) also illustrate stability. FIG. 4(d) shows that for decay 0.9, the controller is mostly stable during the first and the third phase, but has some spikes indicating instability. During the second phase, it is less stable, but FIG. 4(g) shows that it still chooses the correct layout most of the time. FIG. 4(e) shows that for decay 0.95, the controller is more stable during the first and second phases than with decay 0.9, but takes so long to settle that it only becomes stable again at the very end of the third phase. FIG. 4(f) shows that decay 1.0 leads to the best stability for stationary programs, at the cost of sacrificing settling after phase changes.

The choice graphs (FIGS. 4(g/h/i)) follow the probability graphs (FIGS. 4(d/e/f)), in the sense that when the probability is 50/50, the choice forms a horizontal line; when the probability for HI is high, the line rises; and when the probability for BF is high, the line falls. FIG. 4(i) may look unexpected at first. During the second phase, BF is the best layout, yet the choice curve rises even more steeply than during the first phase where HI was the best layout. The reason why it rises is that the controller makes wrong decisions: without decay, it fails to adapt to the phase change. The explanation why the curve rises more steeply is that there are more data reorganizations per second. That is caused by the fact that mtrt has a higher alloc/live ratio than db.

To conclude, this section showed settling times ranging from 15 s to 125 s for decay values of 0.9 and 0.95. Lower decay values lead to less stable controller decisions; when the decay is too small, the controller gets confused by noise in the program behavior. But in the other extreme, when the decay is too high or when there is no decay, the controller cannot adapt to phase changes. This motivates why we designed the controller the way we did. With decay, the softmax controller adapts to phase changes by accurately picking the best data layout for each phase.

Cache and TLB Behavior

This section explores whether the performance improvements of layout auditing come from reducing the program's data cache and TLB miss rates. This section used the same experiments as discussed above to measure a separate set of results. It obtained hardware performance counts from PAPI [S. Browne, J. Dongarra, N. Garner, K. London, and P. Mucci. A scalable cross-platform infrastructure for application performance tuning using hardware counter. In *IEEE Supercomputing (SC)*, 2000], then accumulated the counts for all program threads, excluding the data reorganizer.

Tables 5 and 6 show the results. The columns and rows are the same as in Table 4, and the numbers show percent miss rate increases compared to the layout with the best miss rate for a given program and platform.

It turns out that layout auditing does not always achieve the lowest miss rate. We did not expect that it would: we already saw that layout auditing achieves the best performance, but program cache and TLB miss rates are only one factor in that. They have to be weighed against other costs, such as data reorganization time. Layout auditing does prevent the worst-case miss rates that occur for some programs; without layout auditing, those miss rate increases can easily amount to 100% and more.

TABLE 5

Percent L2 cache miss rate increase compared to best.

| Benchmark | HI | BF | LA | HI | BF | LA | HI | BF | LA |
|---|---|---|---|---|---|---|---|---|---|
| antir | 0 | 0 | 2.3 | 0 | 5.4 | 3.0 | 0 | 0 | 0 |
| bloat | 0 | 19.7 | 10.9 | 0 | 16.2 | 7.7 | 0 | 0 | 0 |
| chart | 12.9 | 0 | 7.8 | 13.1 | 0 | 6.0 | 0 | 0 | 00 |
| compress | 0 | 0 | 0 | 0 | 0 | 0 | | | |
| db | 2.7 | 0 | 2.7 | 3.7 | 3.3 | 0 | 23.4 | 0 | 16.2 |
| eclipse | 0 | 0 | 0 | 0 | 0 | 0 | 0 | 0 | 0 |
| fop | 0 | 3.8 | 0 | 0 | 4.9 | 3.4 | | | |
| hsqldb | 0 | 0 | 4.1 | 0 | 0 | 0 | | | |
| ipsixql | 63.3 | 0 | 4.3 | 49.1 | 0 | 2.1 | 9.5 | 0 | 0 |
| jack | 0 | 0 | 12.9 | 0 | 0 | 0 | | | |
| javac | 0 | 8.2 | 0 | 0 | 6.5 | 6.3 | 0 | 2.1 | 0 |
| jess | 7.8 | 0 | 0 | 4.1 | 0 | 0 | | | |
| jython | 0 | 0 | 0 | 0 | 4.9 | 3.9 | | | |
| luindex | 1.8 | 0 | 0 | 0 | 2.6 | 3.7 | | | |
| lusearch | 0 | 0 | 0 | 0 | 0 | 0 | | | |
| mpegaudio | 0 | 0 | 0 | 0 | 0 | 0 | | | |
| mtrt | 0 | 4.7 | 0 | 0 | 0 | 0 | 0 | 0 | 0 |
| pmd | 0 | 6.9 | 0 | 0 | 0 | 0 | 0 | 0 | 0 |
| pseudojbb05 | 0 | 9.6 | 4.9 | 0 | 10.6 | 3.5 | 0 | 5.0 | 2.8 |
| xalan | 0 | 2.9 | 2.7 | 0 | 5.5 | 0 | 3.3 | 0.7 | 1.9 |
| Average | 4.4 | 2.8 | 2.6 | 3.5 | 3.0 | 2.0 | | | |
| # not 0 | 5 | 7 | 9 | 4 | 9 | 9 | 3 | 2 | 2 |
| Worst | 63.3 | 19.7 | 12.9 | 49.1 | 16.2 | 7.7 | 23.4 | 5.0 | 16.2 |
| | (a) 4-proc. AMD | | | (b) 2-proc AMD | | | (c) 2-proc. Intel | | |

TABLE 6

Percent TLB miss rate increase compared to best.

| Benchmark | HI | BF | LA | HI | BF | LA | HI | BF | LA |
|---|---|---|---|---|---|---|---|---|---|
| antir | 0 | 0 | 0 | 36.2 | 30.4 | 0 | 0 | 0 | 0 |
| bloat | 0 | 11.6 | 8.4 | 0 | 9.4 | 0 | 0 | 21.2 | 0 |
| chart | 0 | 13.8 | 6.7 | 0 | 11.7 | 6.6 | 0 | 7.7 | 7.0 |
| compress | 0 | 0 | 0 | 0 | 0 | 0 | | | |
| db | 0 | 157.7 | 28.0 | 0 | 164.8 | 28.2 | 0 | 131.9 | 14.6 |
| eclipse | 0 | 0 | 0 | 0 | 0 | 0 | 0 | 0 | 0 |
| fop | 0 | 0 | 0 | 5.0 | 0 | 7.6 | | | |
| hsqldb | 0 | 14.3 | 0 | 0 | 16.5 | 7.0 | | | |
| ipsixql | 0 | 0 | 0 | 0 | 205.4 | 0 | 31.6 | 19.3 | 0 |
| jack | 1.8 | 0 | 0 | 1.6 | 1.8 | 0 | | | |
| javac | 0 | 9.0 | 0 | 0 | 17.5 | 14.2 | 0 | 19.4 | 8.9 |
| jess | 0 | 0 | 0 | 0 | 0 | 0 | | | |
| jython | 0 | 0 | 2.6 | 0 | 0 | 0 | | | |
| luindex | 0 | 0 | 0 | 0 | 0 | 0 | | | |
| lusearch | 0 | 4.2 | 3.3 | 0 | 2.4 | 0 | | | |
| mpegaudio | 0 | 0 | 0 | 0 | 0 | 0 | | | |
| mtrt | 0 | 24.4 | 14.7 | 0 | 23.0 | 15.4 | 0 | 18.5 | 7.0 |
| pmd | 0 | 9.5 | 7.9 | 0 | 13.5 | 15.0 | 0 | 17.5 | 15.3 |
| pseudojbb05 | 0 | 12.3 | 5.7 | 0 | 14.0 | 5.0 | 0 | 5.5 | 0 |
| xalan | 0 | 7.4 | 5.9 | 0 | 7.8 | 0 | 3.2 | 24.1 | 5.3 |

TABLE 6-continued

Percent TLB miss rate increase compared to best.

| Benchmark | HI | BF | LA | HI | BF | LA | HI | BF | LA |
|---|---|---|---|---|---|---|---|---|---|
| Average | 0.1 | 13.2 | 4.2 | 2.1 | 25.9 | 4.9 | | | |
| # not 0 | 1 | 10 | 9 | 3 | 13 | 8 | 1 | 8 | 5 |
| Worst | 1.8 | 157.7 | 28.0 | 36.2 | 205.4 | 28.2 | 31.6 | 131.9 | 15.3 |
| | (a) 4-proc. AMD | | | (b) 2-proc AMD | | | (c) 2-proc. Intel | | |

Alternative Layout Auditing Components

This section discusses alternative data reorganizers, profilers, and controllers that fit in the layout-auditing framework presented above.

Alternative Data Reorganizers

Layout auditing is designed to accommodate a variety of off-the-shelf data reorganization techniques. The discussion above already mentioned several data layouts (depth-first, breadth-first, hierarchical, allocation order). Other garbage collectors segregate objects by size, type, or allocating thread. One could even consider a random data layout; while random layouts are unlikely to perform best, they are equally unlikely to perform worst, and can thus effectively prevent pathological interference situations.

While layout auditing works with profile-oblivious data layouts, it can be applied just as easily to decide whether or not to use profile-directed approaches, such as Huang et al.'s online object reordering [Xianglong Huang, Stephen M. Blackburn, Kathryn S. McKinley, J. Eliot B. Moss, Zhenlin Wang, and Perry Cheng. The garbage collection advantage; improving program locality. In *Object-Oriented Programming, System, Languages and Applications (OOPSLA)*, 2004] or the locality optimizations by Chen et al. [Wen Ke Chen, Sanjay Bhansali, Trishul Chilimbi, Xiaofeng Gao, and Weihaw Chuang. Profile-guided proactive garbage collection for locality optimization. In *Programming Language Design and Implementation (PLDI)*, 2006].

As mentioned earlier, layout auditing is not confined to garbage collection; a variety of other data reorganizers has been proposed. One technique is to reorder data arrays or index arrays for scientific programs. Zhang et al. present and simulate a piece of hardware that can remap data to a different layout [Lixin Xhang, Zhen Fang, Mike Parker, Binu K. Mathew, Lambert Schaelicke, John B. Carter, Wilson C. Hsieh, and Sally A. McKee. The Impulse memory controller, *IEEE Transactions on Computers,* 2001]. Another possibility is to change the data layout during allocation, for example, by using different alignments, or by profile-directed techniques.

Alternative Profilers

In the easiest case, the profiler just measures seconds by looking at the clock. The advantage is that this causes no overhead, but the disadvantage is that it makes it hard to isolate the impact of the data layout from the impact of extraneous effects. To complicate things further, it is often desirable to isolate the impact of the layout of some memory subspace from the impact of the layout of other subspaces. This challenge could be addressed with a subspace locality profiler.

Figure 5:
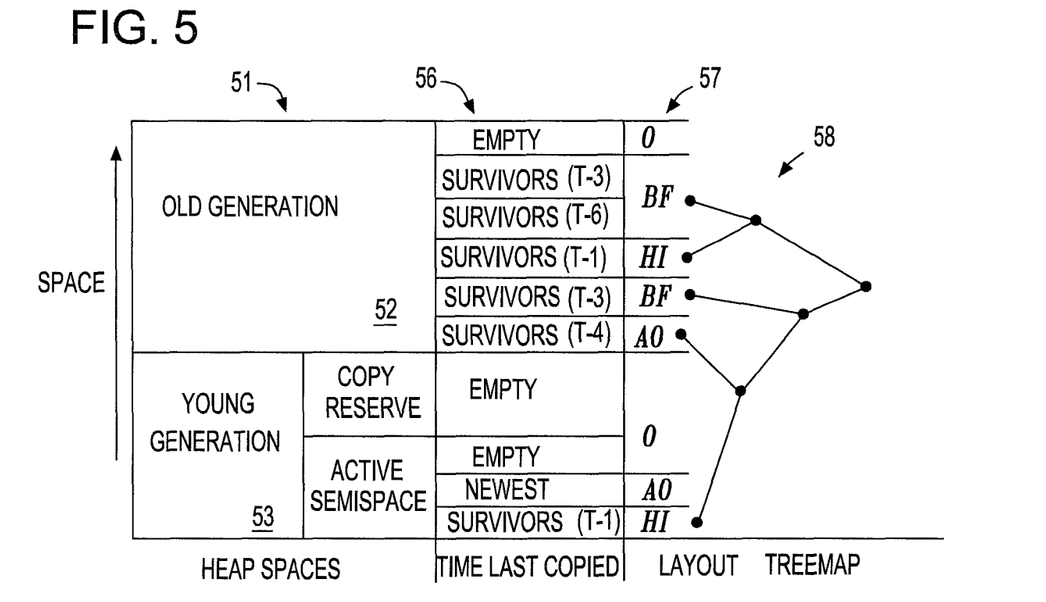
FIG. 5 illustrates mapping from memory addresses to a data layout order.

For example, if the data reorganizer is a generational garbage collector, each collection of the young generation copies some objects within the young generation, and others from the young to the old generation. Over time, a situation like in FIG. 5 arises. The left column 51 shows the heap spaces: an old generation 52, and a young generation 53 with two semispaces 54, 55. The middle column 56 further divides spaces into groups of objects, annotated by the last time they were copied; e.g., "survivors (T-3)" were tenured 3 collections ago, whereas the "newest" objects were allocated after the last collection and have yet to be copied for the first time. Column "layout" 57 shows which copy order, and hence which data layout, the corresponding objects have. It is easy to keep track of the mapping from addresses to memory areas and their data layouts; a subspace locality profiler could do so with a treemap 58. What is needed, then, is a measurement of locality for specific data addresses.

One possibility for this is PEBS (precise event based sampling), where hardware counter overflows generate interrupts, and the interrupt handler can inspect parts of the machine state. Adl-Tabatabai et al. used PEBS on Itanium to identify objects that cause cache misses [Ali-Reza, Adl-Tabatabai, Richard L. Hudson, Mauricio J. Serrano, and Sreenivas Subramoney. Prefetch injection based on hardware monitoring and object metadata. In *Programming Language Design and Implementation (PLDI)*, 2004]. Similarly, one could count misses separately for memory subspaces with different data layouts. On IA32 and AMD, the PEBS machine state does not contain the data address, and each interrupt costs several thousand cycles.

Another possibility for a subspace locality profiler is trace driven cache simulation. To accommodate layout auditing, the tracing and simulation must occur online and automatically. Bursty tracing can produce a memory access trace at low overhead. Online cache simulation has been reported by Zhao, et al. To use online trace-driven simulation for layout auditing, map simulated accesses and misses to data layouts via the treemap from FIG. 5.

A drawback of more sophisticated profilers is that they make more assumptions about how the software and hardware interact. Such assumptions can be misleading: for example, more cache misses do not necessarily imply worse performance if instruction level parallelism overlays them with useful computation.

Alternative Controllers

Layout auditing is designed to accommodate a variety of off-the-shelf machine learning techniques. The present invention, as discussed above, may use a softmax policy. Other possibilities include sequential analysis and reinforcement computation.

Also, there are alternatives for dealing with phase changes. The examples described above use exponential decay of historical profile information. Another possibility is to remember a sliding window of values. There are also more sophisticated stand-alone phase detectors, such as Sherwood et al's basic block vectors [Timothy Sherwood, Erez Perelman, and Brad Calder. Basic block distribution analysis to find periodic behavior and simulation points in applications. In *Parallel Architectures and Compilation Techniques (PACT)*, 2001].

Figure 6:
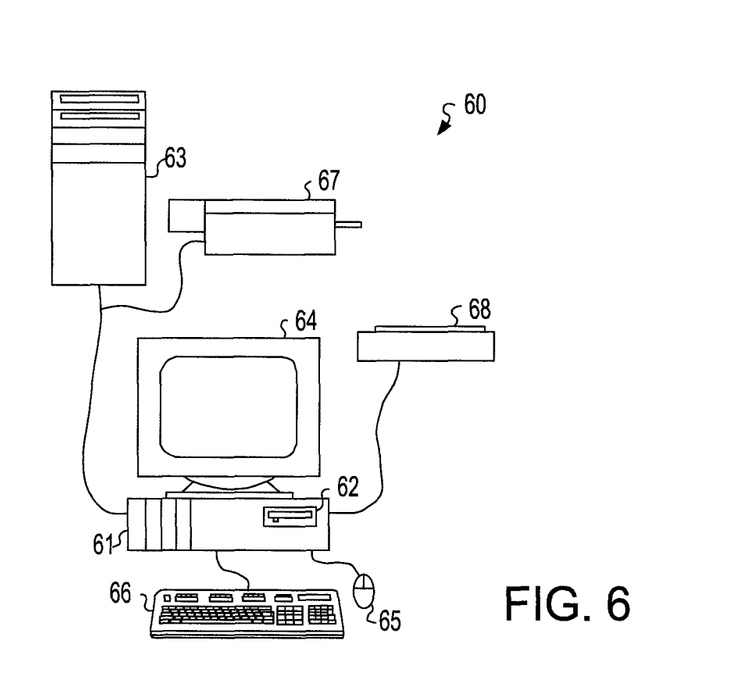
FIG. 6 is a diagram of a computer system that may be used in the practice of the present invention.

The method of the present invention will be generally implemented by a computer executing a sequence of program instructions for carrying out the steps of the method and may be embodied in a computer program product comprising media storing the program instructions. Referring to FIG. 6, a computer system 60 is depicted on which the method of the present invention may be carried out. Processing unit 61, houses a processor, memory and other system components that implement a general purpose processing system that may execute a computer program product comprising media, for example a floppy disc that may be read by processing unit 61 through floppy drive 62.

The program product may also be stored on hard disk drives within processing unit 61 or may be located on a remote system 63 such as a server, coupled to processing unit 61, via a network interface, such as an Ethernet interface. Monitor 64, mouse 65 and keyboard 66 are coupled to processing unit 61, to provide user interaction. Scanner 67 and printer 68 are provided for document input and output. Printer 68, is shown coupled to processing unit 61 via a network connection, but may be coupled directly to the processing unit. Scanner 67 is shown coupled to processing unit 61 directly, but it should be understood that peripherals may be network coupled or direct coupled without affecting the ability of workstation computer 60 to perform the method of the invention.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A system for improving data locality in a memory, comprising:
    a data reorganizer to copy data objects in different data layouts in the memory;
    a profiler for evaluating the performances of the different data layouts; and
    a controller to choose one of the data layouts as optimal based on said evaluating, wherein:
    said profiler outputs information describing said different performances;
    the controller uses said output information to choose the optimal data layout;
    the profiler outputs counts of simulated data accesses, cache misses and TLB misses for each of the data layouts; and
    the controller is an instrumentation-based controller, calculates costs separately for each of the different data layouts using said output costs from the profiler, and calculates probabilities for each of the data layouts from said costs.

2. A system for improving data locality in a memory accessed by a given program, comprising:
    a data reorganizer to copy data objects in a plurality of different data layouts in the memory, wherein the given program accesses each of the data layouts while the given program is running;
    a profiler for evaluating the performance of the program while the program is running and accessing each of the different data layouts; and
    a controller to choose one of the plurality of data layouts as optimal based on said evaluating; and, wherein:
    said profiler outputs information describing said different performances;
    the controller uses said output information to choose the optimal data layout;
    the profiler outputs counts of simulated data accesses, cache misses and TLB misses for each of the data layouts;
    the system further comprises a hardware performance counter that outputs total counts of simulated data accesses, cache misses and TLB misses for all of the data layouts; and
    the controller is a hardware-based controller, calculates costs separately for each of the different data layouts using said output counts from the profiler and said output total counts from the hardware performance counter, and calculates probabilities for each of the data layouts from said costs.

3. A method of operating a profiler to measure the performance of different layouts in memory, comprising the steps of dividing memory into areas that can have a plurality of different data layouts, wherein a running program accesses each of the data layouts; and measuring the locality for each memory area by using the profiler, while the program is running, for evaluating the performance of the program when accessing each of the data layouts, and wherein:
    one of the plurality of data layouts is chosen as optimal based on said evaluating, wherein the measuring step includes the steps of:
    collecting data reference traces;
    using the collected traces to drive a cache and TLB simulation;
    mapping simulated accesses and misses to the data layouts; and
    keeping a count of each simulated miss mapped to each of the data layouts.

4. A method according to claim 3, wherein the using step is performed at the beginning of a garbage collection process.

5. A method according to claim 3, wherein:
    the measuring step includes the further step of filtering some of the accesses, including the steps of filtering access with a reuse distance below a given value, and filtering accesses to objects that are less than a given age; and
    the performances of said different data layouts are measured simultaneously.

* * * * *